Sept. 15, 1959
J. R. MADEIRA
2,903,771
BELT CONVEYOR TROUGHING ROLLER ASSEMBLY
AND LOCKING MEANS THEREFOR
Filed Oct. 3, 1957
2 Sheets-Sheet 1
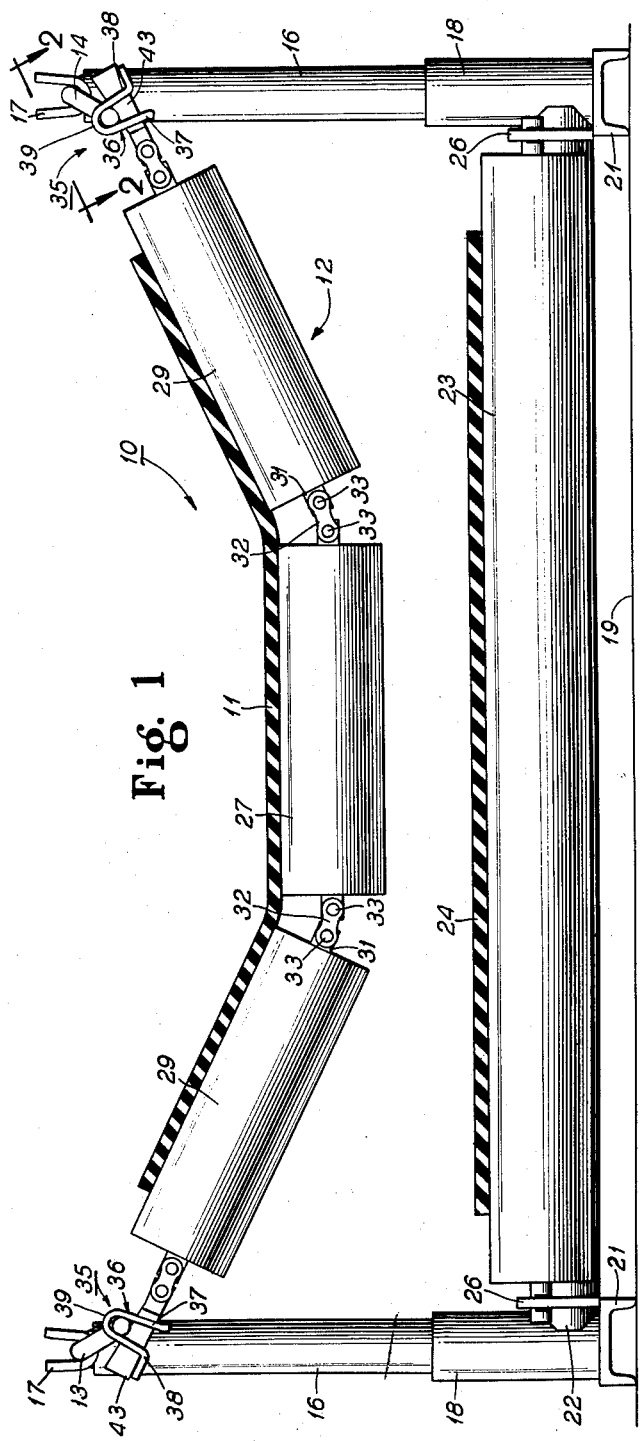
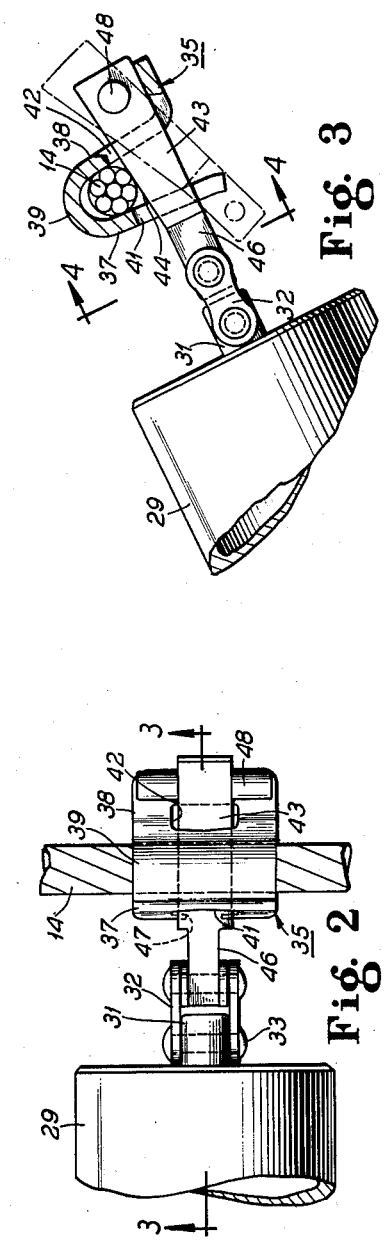
INVENTOR.
John R. Madeira
BY
Murray G. Gleeson
ATTORNEY Sept. 15, 1959 J. R. MADEIRA 2,903,771
BELT CONVEYOR TROUGHING ROLLER ASSEMBLY
AND LOCKING MEANS THEREFOR
Filed Oct. 3, 1957 2 Sheets-Sheet 2

INVENTOR.
John R. Madeira
BY
Murray A. Gleeson
ATTORNEY

United States Patent Office 2,903,771
Patented Sept. 15, 1959

2,903,771

BELT CONVEYOR TROUGHING ROLLER ASSEMBLY AND LOCKING MEANS THEREFOR

John R. Madeira, Chicago, Ill., assignor to Goodman Manufacturing Company, Chicago, Ill., a corporation of Illinois Application October 3, 1957, Serial No. 687,918

2 Claims. (Cl. 24—126)

This invention relates generally to belt conveyors of the type where the conveying reach is supported on flexible strands and more particularly to an improved troughing roller assembly having locking means for locking the assembly to the flexible strands.

In Craggs et al. Pat. No. 2,773,257, issued December 4, 1956 for Conveyor Having Flexible Strand Side Frames and Troughing Roller Assembly Therefor the troughing roller assemblies supporting the conveying reach are held in position to the side frames by locking pins or spikes which wedge the rope strand into a mounting bracket. These pins have become separated from the troughing assembly, and oftentimes the wedges lose their friction grip against the rope, with consequent loosening of the assembly and misalignment of the conveying reach.

With the foregoing considerations in mind it is a principal object of this invention to provide a troughing roller assembly having locking means which cannot become separated from the assembly.

Another object is to provide a troughing roller assembly so arranged that the load thereon maintains the locking means effective to lock the assembly to the strands.

Other objects and important features of the invention will be apparent from a study of the specification following taken with the drawings which together show a number of preferred embodiments of the invention and what are now considered to be the best modes of practicing the principles thereof. Other embodiments may be suggested to those having the benefits of the teachings herein and such other embodiments are intended to be reserved especially as they fall within the scope and spirit of the subjoined claims.

In the drawings:

Fig. 1 is an elevational view of a portion of a belt conveyor of the type where the conveying reach is supported upon flexible strand means, and showing a troughing roller assembly supported by the flexible strand means, said troughing roller assembly having the improvements according to one embodiment of the invention embodied therein;

Fig. 2 is a detailed plan view of one end of the troughing roller assembly seen in Fig. 1 showing details of mounting the same to the flexible strand means;

Fig. 3 is a section taken substantially along the line 3—3 of Fig. 2, and looking in the direction of the arrows;

Figure 4:
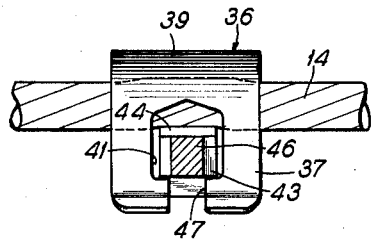
Fig. 4 is a side elevational view looking in the direction of the arrows 4—4 of Fig. 3.

Referring now particularly to Figs. 1 to 4 of the drawings, the improvements according to the present invention are embodied in an endless belt conveyor referred to generally by the reference numeral 10. The conveyor shown is of the type where a conveying reach 11 thereof is supported upon a troughing roller assembly indicated generally by the reference numeral 12, the troughing roller assembly being suspended between spaced flexible strand means 13 and 14. These are supported at intervals throughout their lengths upon supports or standards 16, each such standard having a U-shaped saddle 17 at the top thereof for receiving the flexible strand means.

The standards 16 are received telescopically in tubular sockets 18, and the position of each standard 16 can be adjusted therein to accommodate irregularities in a mine floor 19. The lower end of each socket sets upon a foot 21 and the feet 21 are maintained in proper spaced apart relationship by means of a strut or spreader 22. A return idler 23 for a return reach 24 is supported at each end on brackets 26 secured to the strut or spreader 22.

The troughing roller assembly 12 shown consists of a center load supporting roller 27 flanked by inclined wing or troughing rollers 29. Each of these rollers is arranged to turn upon a shaft 31, the shafts 31 protruding beyond the ends of the rollers. The rollers 27 and 28 are articulately connected by means of links 32, each end of the link 32 being pin connected as at 33 to the protruding shaft ends 31.

According to the present invention means are provided for connecting the troughing roller assembly 12 to the flexible strand means 14 in such a fashion that the load on the conveying reach 11 operates to secure the assembly 12 in position on the flexible strand means, such means being so-arranged that the troughing roller assembly 12 can be removed from the strand means or adjusted in position thereon as desired.

Such means are indicated generally by the reference numeral 35 and includes a bracket 36 having a pair of limbs 37 and 38 which straddle the flexible strand means. The two limbs 37 and 38 are connected by a bight 39 which forms a saddle for seating the flexible strand means.

Limbs 37 and 38 are provided respectively with aligned openings 41 and 42, the aligned openings 41 and 42 receiving a pin 43 having a wedging surface 44 adapted to engage the flexible strand means 14 and urge same into the bight 39.

Pin 43 has a portion 46 of a reduced cross section articulately connected to the portion of the shaft 31 protruding beyond the outer end of the wing roller 28. The opening 41 has an entrant slot 47 thereto, the opening in the slot 47 being less than the dimension of the pin 43 but larger than the dimension of the portion 46 of the pin 43.

The outer end of the pin 43 has a pair of stub arms 48 extending at right angles thereto and capable of being engaged by a suitable prying tool, not shown, whereby the pin 43 can be moved to the right as seen in Fig. 2 until the reduced cross section portion is opposite the slot 47, whereupon the pin 43 can be pivoted downward as seen in Fig. 3 and the bracket 36 can be removed from the flexible strand means 14.

It will be noted that the stub arms 48 on the locking pin 43 maintain the bracket 36 in assembled relationship to the troughing roller assembly 12 at all times, and since the locking pin 43 is connected to the troughing roller assembly 12 none of the parts completing the assembly can be lost or misplaced.

The load on the conveying reach 11 which is transmitted into the troughing roller assembly 12 maintains a pull upon the two pins 43, so that their wedging surfaces 44 at all times moves the flexible strand means 14 more tightly into the bight 39. Once the assembly is located on the flexible strand means and the conveying reach 11 is loaded, the troughing roller assembly 12 and its locking means 35 cannot be accidentally dislodged or moved from position on the flexible strand means.

Figure 6:
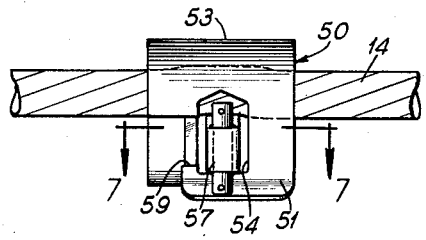
Fig. 6 is an elevational view looking in the direction of the arrows 6—6 of Fig. 5, and showing details whereby the troughing roller assembly can be removed or placed upon the flexible strand means.
Figure 7:
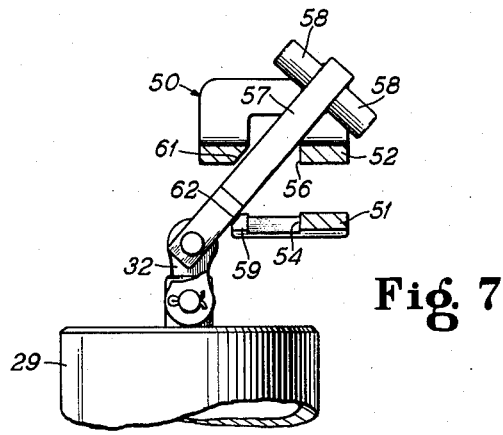
Fig. 7 is a sectional view taken along the line 7—7 of Fig. 6.
Figure 5:
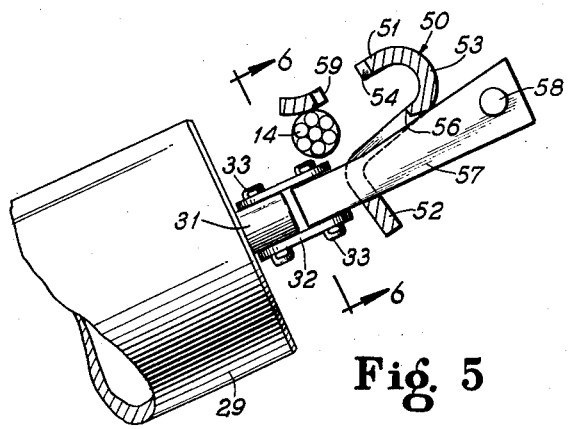
Fig. 5 is an elevational view showing details of another embodiment of the invention.

Referring now to Figs. 5 to 7 of the drawings there is shown another embodiment of the invention whereby the wedging pin need not have a reduced cross section portion as so described with reference to Figs. 1 to 4 inclusive.

In this embodiment of the invention the bracket is supported on the strand 14, and is indicated by the reference numeral 50. The bracket 50 includes a pair of downward extending limbs 51 and 52 which straddle the flexible strand means 14, the two limbs being joined in a U-shaped bight 53 forming a saddle resting upon the flexible strand means 14. Limbs 51 and 52 are provided respectively with aligned openings 54 and 56 which receive a wedged shaped pin 57 having stub arms 58 which together with the pin extend outside of the outer limb 52.

In this embodiment of the invention the two stub arms 58 can be engaged by the prying tool and moved outward as seen with the embodiment of Figs. 1 and 2. After the wedging pin 57 is released from engagement with the flexible strand means 14 the pin 57 can be tilted to one side so that its inner end adjacent the links 32 and 32 can move in a slot 59 providing an entrant opening into the inner limb 51 as seen in Fig. 7. In order to accommodate such tilting movement of the pin 57 one side of the opening 56 can be relieved as seen at 61 in Fig. 7, slot 59 being likewise relieved as at 62. After the pin has been moved out of the slot 59 as seen in Fig. 7, the limb 51 of bracket 50 can be lifted from and around the flexible strand means as seen in Fig. 5. The stub arms 58 prevent the bracket 50 from becoming disassembled from the troughing roller assembly 12 as with the embodiment of Figs. 1 to 4.

In both embodiments of the invention the load on the conveying reach and transmitted into the troughing roller assembly 12 maintains the locking means effective movement along the flexible strand means until the conveyor is disassembled, or until the troughing roller assembly 12 is adjusted in position on the flexible strand means.

While the invention has been described in terms of a number of preferred embodiments thereof its scope is intended to be limited only by the claims here appended.

I claim as my invention:

1. A connecting device for connecting a conveyor component to a flexible strand of a flexible sideframe conveyor; said device comprising a bracket member having a pair of spaced apart substantially rigid limb portions and a bight portion connecting the limb portions together; one of said limb portions having an opening therein, the other said limb portion having an opening therein and an open ended entrant slot to the opening, said opening in the said other limb portion being disposed in alignment with the opening in the said one limb portions; an elongated longitudinally tapered locking pin for wedging such flexible strand between the intermediate portion of the locking pin and the bight portion of the bracket member, one end portion of the locking pin having a dimension that is smaller than a corresponding dimension of the entrant slot with the intermediate and the other end portions of the locking pin having corresponding dimensions that are larger than the said dimension of the entrant slot; means adjacent the said one end portion of the locking pin for securing the locking pin to such conveyor component; and means moveably mounting the locking pin within the aligned openings of the limb portions with the intermediate portion of the locking pin normally engaging the said other limb portion and the said other end portion of the locking pin normally engaging the said one limb portion; said last named means including pivot means adjacent the said other end portion of the locking pin pivotally mounting the locking pin to the one limb portion for pivotal movement of the intermediate portion of the locking pin toward and from the bight portion of the bracket member and also for limiting generally longitudinal movement of the locking pin within the aligned openings of the limb portions, whereby said locking pin may first be moved so that the said one end portion of the locking pin registers with the entrant slot and then pivoted so that the intermediate portion of the locking pin is moved in a direction away from the bight portion of the bracket member to release the securing device from such flexible strand.

2. The connecting device as set forth in claim 1 wherein said last named means comprises a pair of lug portions each projecting generally laterally from an opposed side of the said other end portion of the locking pin with said lug portions being disposed substantially normal to the longitudinal axis of the locking pin for engagement with the one limb portion of the bracket member.

References Cited in the file of this patent

UNITED STATES PATENTS

| 667,530 | Johnson | Feb. 5, 1901 |
| 1,050,816 | Deslauriers | Jan. 21, 1913 |
| 2,539,234 | Dobkowski | Jan. 23, 1951 |
| 2,773,257 | Craggs | Dec. 4, 1956 |
| 2,776,044 | Lo Presti | Jan. 1, 1957 |
| 2,860,909 | Isaac | Nov. 18, 1958 |

FOREIGN PATENTS

| 292,214 | Switzerland | July 31, 1953 |
| 404,623 | Italy | Aug. 22, 1943 |